US008612409B2

(12) United States Patent
Tomkins et al.

(10) Patent No.: US 8,612,409 B2
(45) Date of Patent: Dec. 17, 2013

(54) METHOD AND APPARATUS FOR DETECTING AND EXPLAINING BURSTY STREAM EVENTS IN TARGETED GROUPS

(75) Inventors: Andrew Tomkins, San Jose, CA (US); Shanmugasundaram Ravikumar, Berkeley, CA (US); Cameron Marlow, New York, NY (US); Jasmine Novak, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 907 days.

(21) Appl. No.: 11/958,913

(22) Filed: Dec. 18, 2007

(65) Prior Publication Data
US 2009/0157651 A1 Jun. 18, 2009

(51) Int. Cl.
*G06F 17/30* (2006.01)

(52) U.S. Cl.
USPC .............................. 707/705; 707/737; 707/754

(58) Field of Classification Search
USPC .................................. 707/712, 705, 737, 754
See application file for complete search history.

(56) References Cited

U.S. PATENT DOCUMENTS

| 5,343,465 A * | 8/1994 | Khalil ............................ 370/232 |
| 5,708,814 A * | 1/1998 | Short et al. .................... 710/260 |
| 2004/0199496 A1 * | 10/2004 | Liu et al. ............................. 707/3 |
| 2005/0102259 A1 * | 5/2005 | Kapur ................................. 707/1 |
| 2005/0251860 A1 * | 11/2005 | Saurabh et al. ................... 726/23 |
| 2007/0094247 A1 * | 4/2007 | Chowdhury et al. .............. 707/4 |
| 2007/0121674 A1 * | 5/2007 | Chen et al. ..................... 370/468 |
| 2007/0192281 A1 * | 8/2007 | Cradick et al. .................... 707/2 |
| 2007/0239452 A1 * | 10/2007 | Madhavan et al. ............. 704/252 |
| 2008/0255935 A1 * | 10/2008 | Madhavan et al. ............... 705/14 |
| 2009/0006311 A1 * | 1/2009 | Ting et al. .......................... 707/2 |
| 2009/0086755 A1 * | 4/2009 | Chen et al. ..................... 370/468 |

OTHER PUBLICATIONS

Article entitled "Integrated Folksonomies with the Semantic Web", dated Jun. 2007.*
Article entitled "The Semantic Web: Research and Applications" by Franconi et al., dated Jun. 2007.*

* cited by examiner

*Primary Examiner* — Mahesh Dwivedi
(74) *Attorney, Agent, or Firm* — Brinks Gilson & Lione

(57) ABSTRACT

A method and apparatus are provided for detecting and explaining bursty stream events in targeted groups. In one example, the method includes receiving validated bursty events, finding explanatory data sources having relevant bursty events that are relevant to the validated bursty events, wherein the explanatory sources explain the presence of the validated bursty events, correlating the validated bursty events to the relevant bursty events of the explanatory data sources to obtain burst results, and sending the burst results to a burst database that is accessible to an end user.

20 Claims, 3 Drawing Sheets

US 8,612,409 B2

METHOD AND APPARATUS FOR DETECTING AND EXPLAINING BURSTY STREAM EVENTS IN TARGETED GROUPS

FIELD OF THE INVENTION

The present invention relates to stream events, such as user query streams sent to an Internet search engine. More particularly, the present invention relates to detecting and explaining bursts (or frequency spikes) in stream events.

BACKGROUND OF THE INVENTION

A search engine, such as Yahoo!®, is an example of an entity that takes in and handles user queries. A query may be, for example, a keyword search in a web browser at the home page of Yahoo!®. Occasionally, a particular query is that of multiple users and may exhibit a sudden change in volume and rate.

Analyzing a query stream to identify queries that exhibit a sudden change in volume and rate is a valuable task. Such analyses of query streams can be used to influence various components of the search engine in one of several ways. Unfortunately, conventional methods of analyzing query streams do not comprehensively analyze query logs in real-time to identify queries that exhibit an unusual change in volume and/or rate.

SUMMARY OF THE INVENTION

What is needed is an improved method having features for addressing the problems mentioned above and new features not yet discussed. Broadly speaking, the present invention fills these needs by providing a method and apparatus for detecting and explaining bursty stream events in targeted groups. It should be appreciated that the present invention can be implemented in numerous ways, including as a method, a process, an apparatus, a system or a device. Inventive embodiments of the present invention are summarized below.

In one embodiment, a method of explaining bursty events of an event stream is provided. The method comprises receiving validated bursty events, finding explanatory data sources having relevant bursty events that are relevant to the validated bursty events, wherein the explanatory sources explain the presence of the validated bursty events, correlating the validated bursty events to the relevant bursty events of the explanatory data sources to obtain burst results, and sending the burst results to a burst database that is accessible to an end user.

In another embodiment, an apparatus for explaining bursty events of an event stream is provided. The apparatus comprises a receiver device configured to receive validated bursty events, an explainer device configured to find explanatory data sources having relevant bursty events that are relevant to the validated bursty events, wherein the explanatory sources explain the presence of the validated bursty events, a correlation device configured to correlate the validated bursty events to the relevant bursty events of the explanatory data sources to obtain burst results, and a sender device configured to send the burst results to a burst database that is accessible to an end user.

In still another embodiment, a computer readable medium carrying one or more instructions for explaining bursty event of an event stream is provided. The one or more instructions, when executed by one or more processors, cause the one or more processors to perform the steps of receiving validated bursty events, finding explanatory data sources having relevant bursty events that are relevant to the validated bursty events, wherein the explanatory sources explain the presence of the validated bursty events, correlating the validated bursty events to the relevant bursty events of the explanatory data sources to obtain burst results, and sending the burst results to a burst database that is accessible to an end user.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for a method and apparatus for detecting and explaining bursty stream events in targeted groups is disclosed. Numerous specific details are set forth in order to provide a thorough understanding of the present invention. It will be understood, however, to one skilled in the art, that the present invention may be practiced with other specific details.

Figure 1:
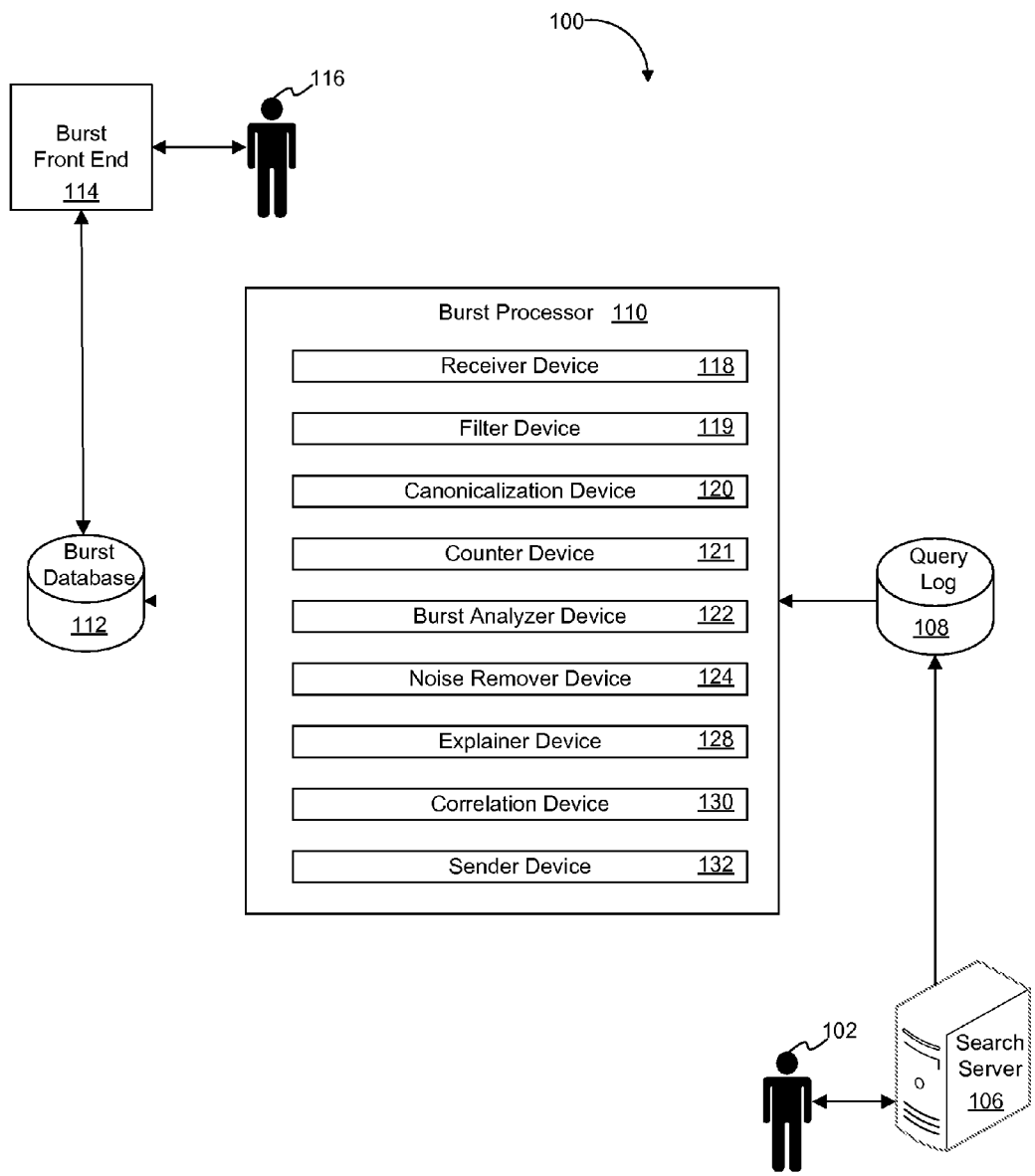
FIG. 1 is a schematic diagram of a system for detecting and explaining bursty stream events, in accordance with an embodiment of the present invention.

FIG. 1 is a schematic diagram of a system 100 for detecting and explaining bursty stream events, in accordance with an embodiment of the present invention. The search server 106 receives a stream of events that may come from a client user 102, or multiple client users. The client users 102 are not a part of the processing, but do provide the raw data that the system 100 processes. A stream of events may be any of a wide variety of different event streams. For example, an event stream may be a stream of query events, a stream of click events, a stream of operations that occur in another part of the search engine, a stream of addresses listed on a map, or a stream of operations from an online game, among other things.

For explanatory purposes, the following description will primarily use a query stream as an example of an event stream. A query stream may be a keyword search from, for example, a client browser, a mobile device or a voice interface, among other things. However, the invention is not so limited to query streams; the invention generically applies to any of a wide variety of different event streams.

An important goal of the system 100 is to detect and explain which events are suddenly more frequent or more prevalent. The system 100 creates a query log 108 of the query streams received from the search server 106. The burst processor 110 receives queries in the query log 108. The system 100, including the burst processor 110, comprises various devices that carry out the meat of the processing. A device is software, hardware or a combination thereof. Devices of the burst processor include, but are not limited to, a receiver device 118, a canonicalization device 120, a counter device 121, a burst analyzer device 122, a noise remover device 124, an explainer device 128, a correlation device 130 and a sender device 132. Each device is configured to carry out one or more processes of the system 100. These processes are described in further detail with reference to FIG. 2 and FIG. 3 below.

The burst processor 110 analyzes a query log in real-time to identify queries that exhibit an unusual change in volume and/or rate. To do the identification, the burst processor 110 uses a conventional burst detection algorithm, such Kleinberg's algorithm, which is explained in "Bursty and Hierarchical Structure in Streams", Jon Kleinberg, Proceeding of 8$^{th}$ ACM SIGKDD International Conference on Knowledge Discovery and Data Mining, 2002. Kleinberg recognized the premise that the appearance of a topic in a document stream is signaled by a "burst of activity," with certain features rising sharply in frequency as the topic emerges. Another conventional burst detection algorithm involves the use commonly available elementary statistical measures. These algorithms take a stream of queries, aggregated over a period ranging from the last few hours to last few days, and output a subset of the queries, along with the starting time of the burst and a score that capture how bursty is the query.

Based on the subset of the bursty queries outputted, first, the burst processor 110 merges queries that are semantically related. To do this, the burst processor 110 carries one or both of the following steps: (a) merge queries that share a certain fraction of terms and (b) merge queries that share a certain fraction of results. Queries that may be merged may include, for example, "Britney Spears" queries, "Britney Spears pics" queries, and "Britney Spears pictures" queries.

Second, the burst processor 110 explains the reason for this query burst behavior by consulting other sources of information, including news, blogs, forums, bulletin boards, multimedia, and social media sites. Supporting evidence for the bursty behavior is said to exist if the time of creation of these supporting objects concurs with the time of the bursty activity of the query. For example, the other sources of information may reveal that Britney Spears just came out with a new album. The supporting evidence, if any, is to be integrated in search results and other points of consumption of the bursty information. These search results and other points of consumption are stored in a burst database 112. A user 116 may access the information in the burst database 112 through a burst front end 114. The end user 116 may or may not be the same as the client user 102.

The burst processor 110 may also apply this scheme to work in narrower settings. The first is to consider verticals, such as autos, finance, news, etc. The second is detecting bursty queries for a particular demographic, geographic or gender, among other human categories. The system 100 includes a filter device 119 in the burst processor 110 to handle the filtering of these particular human categories. The filter device may alternatively be located in the query log 108. The filter device allows only queries that pass through to be considered for subsequent burst analysis. For example, the bursty queries may include queries issued by teenagers living in Omaha, Nebr. in the most recent week.

Figure 2:
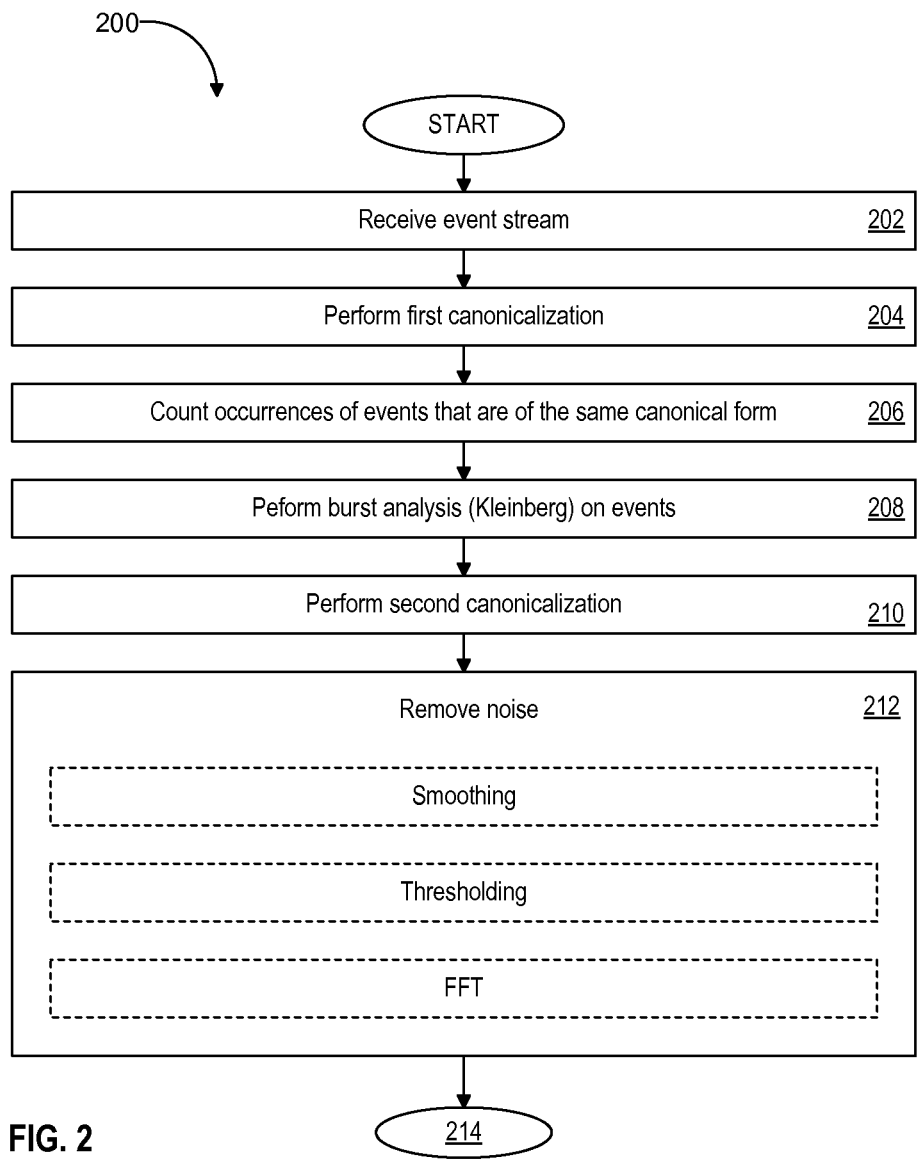
FIG. 2 is a flowchart for a method for detecting bursty queries, in accordance with an embodiment of the present invention.

FIG. 2 is a flowchart for a method 200 for detecting bursty queries, in accordance with an embodiment of the present invention. The method 200 starts in step 202 where the system receives an event stream, for example, a query event stream. Next, the system performs a first canonicalization in step 204. Canonicalization involves merging similar events together. In the case of query events, canonicalization involves merging semantically similar words into the proper canonical spelling. For example, queries for "Britiny Spears" (improper spelling) and queries for "Britney Speers" (improper spelling) may be merged into the proper canonical spelling of "Britney Spears". Accordingly, without knowing if anything is a frequent or infrequent query and without doing any further frequency analysis, the system starts to merge some queries together through this first canonicalization step.

The method 200 proceeds to step 206, where the system counts occurrences of events (e.g., queries) that occur in the same canonical form per each time unit. The granularity of a time unit is a parameter of the system. The granularity may be any selected time period, for example, a day, an hour, a minute or a second, among other things. For example, in one hour, the system will count; in the next hour, the system will count again, and so on. Following this counting step, the method 200 moves to step 208 where the system performs a burst analysis. This burst analysis reveals which event clusters (e.g., query event clusters) are occurring more frequently than they have historically. The burst analysis may be carried out using a conventional burst detection algorithm or a commonly available elementary statistical measure, as discussed above with reference to FIG. 1.

Next, in step 210, the system performs a second canonicalization. Because of prior steps of method 200, this second canonicalization is performed while the system is equipped with information on bursts and frequencies. Accordingly, the system may perform a more comprehensive merging together of events (e.g., queries) at this point. For example, there may be a frequency spike for a "Federer" query, as well as a frequency spike for a "Federer Wimbledon Championship" query. There may be no readily available information, based only on words, to indicate these different queries are of the same frequency spike. However, based on prior steps, the system may detect, for example, that the two queries occur at about the same time period or that the queries resulted in the same pages returned. Accordingly, the system is equipped with sufficient information to bring different events (e.g., different queries) into a single event cluster (e.g., single query event cluster).

The method 200 then moves to step 212 where the system removes noise from the canonicalized events (e.g, canonicalized queries). This noise removal step preferably involves performing smoothing calculations, thresholding operations and FFTs (Fast Fourier Transforms) on the canonicalized queries. The output 214 of the method 200 is validated bursty events (e.g., validated bursty queries).

Figure 3:
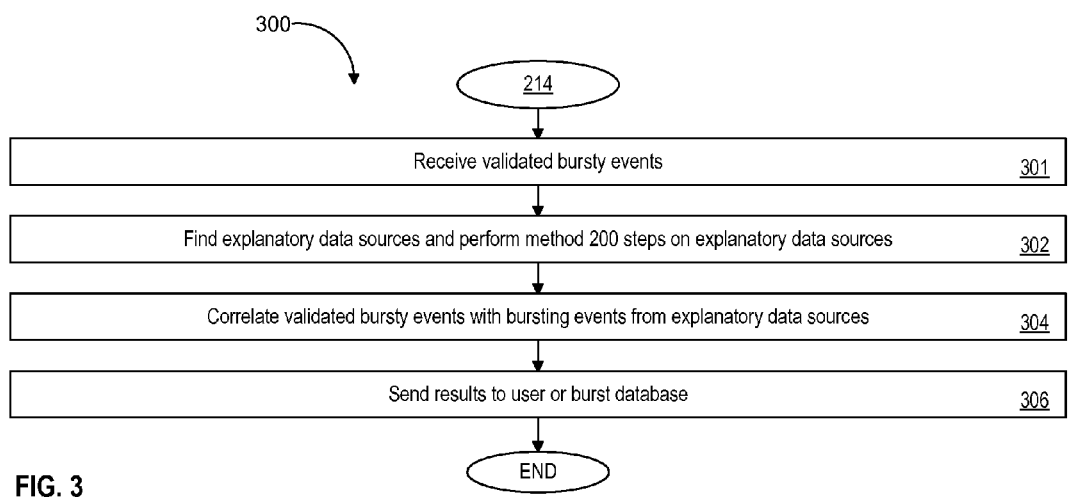
FIG. 3 is a flowchart for a method for explaining bursty events (e.g., bursty queries), in accordance with an embodiment of the present invention.

FIG. 3 is a flowchart for a method 300 for explaining bursty events (e.g., bursty queries), in accordance with an embodiment of the present invention. The method 300 starts in step 301 where the system receives validated bursty queries, which are preferably the output 214 from the method 200 of FIG. 2. Next, in step 302, the system finds explanatory data sources and performs the steps of method 200 on the explanatory data sources, as opposed to on event streams. Explanatory data sources are a corpus of searches derived from various search engines, for example, search engines directed toward videos, music, news, blogs, forums or photo sharing (e.g., Flickr™), among other things. In other words, step 302 involves finding, within the explanatory data sources, bursty events that are relevant to the validated bursty events.

The system specifically uses the presence of the relevant bursty events found in the explanatory data sources to explain the presence of the validated bursty events. Accordingly, the method 300 then moves to step 304 where the system correlates the validated bursty events with the relevant bursty events found in the explanatory data sources. In step 306, the system sends the results of the correlation to a user. When there are multiple explanatory sources, the system performs a process of going to each source, performing a source specific analysis on each source to determine whether each source offers any explanatory information, retrieving all that explanatory information from each source, and then correlating the explanatory information to the bursty events.

Step 302 is not necessarily restricted to a small fixed number of search analyses or explanatory data sources. The system may use specific analyses that depend on the nature of particular explanatory data sources to explain why a burst (or frequency spike) happens. For example, when a music log is queried, in addition to looking at the searches that people have done in music, the system may take the validated burst events and match it against a dictionary of known musical artists. Such matching may not include any log information searches for explanatory data sources. In other words, this alternative embodiment does not necessarily include a comprehensive search for explanatory data sources, but rather a look at the existence of relevant occurrences and documents. For example, to determine whether a particular bursty event comes from the technical community, the system may look at documents that may have been added to del.icio.us, which is a bookmarking tool on Yahoo!® for adding web bookmarks to highly technical content; if the system finds that bookmarks have been added with tags that correspond to the bursty query that the system is trying to explain, those tags are strong evidence of why the query is bursty; the bursty query is relevant to a certain URL (uniform resource locator) that is an interest to the del.icio.us users.

Next, the method moves to step 306 where the system sends the results to a burst database that is accessible to an end user. The method 300 is then at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving validated bursty events, finding explanatory data sources having relevant bursty events that are relevant to the validated bursty events, correlating the validated bursty events to the relevant bursty events of the explanatory data sources to obtain burst results, and sending the burst results to a burst database that is accessible to an end user, according to processes of the present invention.

Advantages

Analyzing an event stream (e.g., query event stream) to identify events that exhibit a sudden change in volume and rate is a valuable task. Analyses of event streams according to the present invention can be used to influence various components of the search engine in one of several ways. One way is a presentation of the search results for these events such as including results from news, blogs, and multimedia. A second way is a presentation of advertisements that take advantage of this frequency spike. A third way is a separate page of daily or hourly spiking events; this also includes providing a commenting capability to the users to tag/comment on these events; these comments will be maintained as a bulletin board for that event. A fourth way is integrating this data with the ad monetization system by providing this information to the advertisers almost instantly as a forecast component.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of explaining bursty events, the method comprising:
receiving an event stream, wherein the event stream comprises a plurality of search queries submitted to a search engine;
identifying a bursty event cluster, within the event stream, that comprises search queries within a time period relating to a common subject, the identifying comprises the steps of:
merging, into the bursty event cluster, search queries of the event stream that share a threshold fraction of search engine results returned by the search engine in response to the search queries; and
merging, into the bursty event cluster, search queries of the event stream that share a threshold fraction of query terms; and
determining a genre associated with the common subject;
analyzing a source of data separate from the event stream that corresponds to the determined genre, relevant to the common subject of the bursty event cluster, wherein the analyzing comprises the steps of:
receiving a relevant data stream separate from the event stream, the relevant data stream comprising events from at least one source of data corresponding to the time period; and
identifying an explanatory event from the relevant data stream, wherein the explanatory event aids in interpreting the occurrence of the search queries of the bursty event cluster.

2. The method of claim 1, wherein identifying a bursty event cluster within the event stream further comprises the steps of:
    counting occurrences of events in the event stream within the time period that are of the same canonical form;
    performing a burst analysis on the event stream; removing noise from the event stream; and
    forming a bursty event cluster from the event stream.

3. The method of claim 1, wherein the bursty event cluster comprises queries input into a search engine by a client user.

4. The method of claim 1, wherein the event stream further comprises at least one of: user clicks in a web browser, operations that occur in a part of a search engine, addresses listed on a map, and operations from an online video game.

5. The method of claim 1, wherein the identifying an explanatory event within the relevant data stream further comprises the steps of:
    counting occurrences of events in the relevant data stream that are of the same canonical form;
    performing a burst analysis on the relevant data stream;
    removing noise from the relevant data stream;
    forming an explanatory event cluster from the relevant data stream; and deriving an explanatory event from the explanatory event cluster.

6. The method of claim 1, further comprising filtering the bursty event cluster according to at least one of demographic, geographic, and gender information.

7. The method of claim 1, wherein the event stream comprises a plurality of webpage bookmarks, and wherein the identifying of a bursty event cluster comprises identifying webpage bookmarks relating to a common subject.

8. The method of claim 7, wherein the explanatory event aids in interpreting the occurrence of the webpage bookmarks of the bursty event cluster.

9. The method of claim 2, wherein the removing noise from the event stream includes performing smoothing calculations, thresholding operations, and Fast Fourier Transforms on data of the event stream.

10. The method of claim 5, wherein the removing noise from the relevant data stream includes performing smoothing calculations, thresholding operations, and Fast Fourier Transforms on data of the relevant data stream.

11. The method of claim 1, further comprising displaying the bursty event cluster and an editable tag including information on the explanatory event.

12. A non-transitory computer readable medium storing a set of instructions for explaining bursty events which, when executed by a computer, cause the computer to perform the steps of:
    receiving an event stream, wherein the event stream comprises a plurality of search queries submitted to a search engine;
    identifying a bursty event cluster, within the event stream, that comprises search queries within a time period relating to a common subject, the identifying comprises the steps of:
    merging, into the bursty event cluster, search queries of the event stream that share a threshold fraction of search engine results returned by the search engine in response to the search queries; and
    merging, into the bursty event cluster, search queries of the event stream that share a threshold fraction of query terms;
    determining a genre associated with the common subject;
    analyzing a source of data separate from the event stream that corresponds to the determined genre, relevant to the common subject of the bursty event cluster, wherein the analyzing comprises the steps of:
    receiving a relevant data stream separate from the event stream, the relevant data stream comprising events from at least one source of data corresponding to the time period; and
    identifying an explanatory event from the relevant data stream, wherein the explanatory event aids in interpreting the occurrence of the search queries of the bursty event cluster.

13. The computer readable medium of claim 12, wherein identifying a bursty event cluster within the event stream further comprises the steps of:
    counting occurrences of events in the event stream within the time period that are of the same canonical form;
    performing a burst analysis on the event stream;
    removing noise from the event stream; and
    forming a bursty event cluster from the event stream.

14. The computer readable medium of claim 12, wherein the bursty event cluster comprises queries input into a search engine by a client user.

15. The computer readable medium of claim 12, wherein the event stream further comprises at least one of: user clicks in a web browser, operations that occur in a part of a search engine, addresses listed on a map, and operations from an online video game.

16. The computer readable medium of claim 12, wherein the identifying an explanatory event within the relevant data stream further comprises the steps of:
    counting occurrences of events in the relevant data stream that are of the same canonical form;
    performing a burst analysis on the relevant data stream;
    removing noise from the relevant data stream;
    forming an explanatory event cluster from the relevant data stream; and
    deriving an explanatory event from the explanatory event cluster.

17. The computer readable medium of claim 12, wherein the instructions further comprise filtering the bursty event cluster according to at least one of demographic, geographic, and gender information.

18. The computer readable medium of claim 13, wherein the removing noise from the event stream includes performing smoothing calculations, thresholding operations, and Fast Fourier Transforms on data of the event stream.

19. The computer readable medium of claim 16, wherein the removing noise from the relevant data stream includes performing smoothing calculations, thresholding operations, and Fast Fourier Transforms on data of the relevant data stream.

20. The computer readable medium of claim 12, wherein the instructions when executed further cause displaying the bursty event cluster and an editable tag including information on the explanatory event.

* * * * *